April 1, 1941.   R. H. ROSENBERG   2,237,164
AIR COOLING DEVICE FOR BRAKES
Filed June 28, 1940
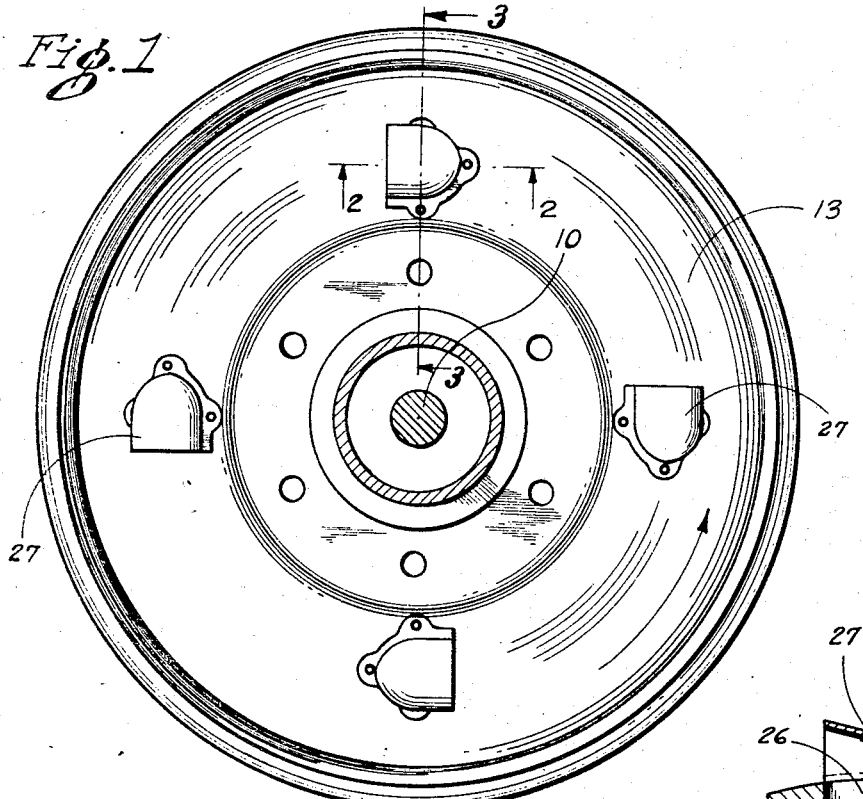
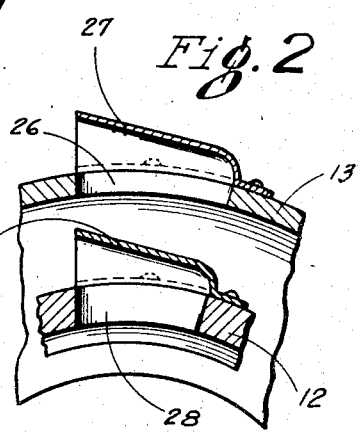
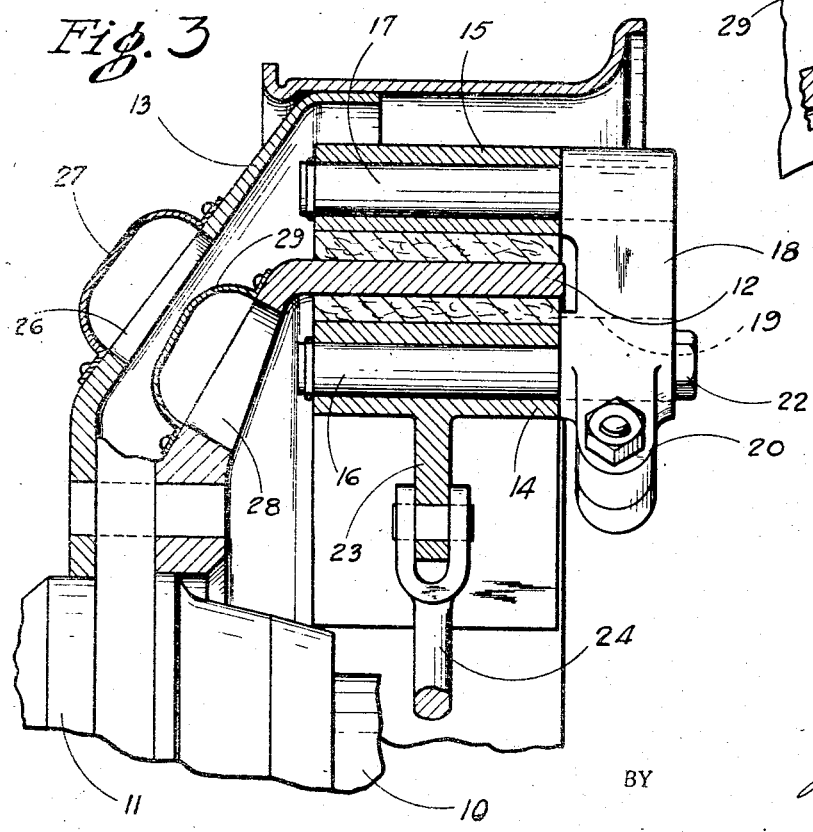
INVENTOR.
RALPH H. ROSENBERG
BY
ATTORNEYS.

Patented Apr. 1, 1941

2,237,164

UNITED STATES PATENT OFFICE 2,237,164

AIR COOLING DEVICE FOR BRAKES

Ralph H. Rosenberg, Detroit, Mich., assignor to Detroit Duo-Grip Brake Company, Detroit, Mich., a corporation of Michigan Application June 28, 1940, Serial No. 342,988

4 Claims. (Cl. 188—264)

This invention relates broadly to brakes for motor vehicles and more specifically to improvements therein adapted to effect the dissipation of heat from the brake drums and wheels.

In my prior Patents No. 2,143,998, issued January 17, 1939, and No. 2,192,696, issued March 5, 1940, and my copending applications filed of even date herewith, I have disclosed a vehicular brake which embodies generally an internal and external brake shoe organized for simultaneous application through a fork mounted to straddle the flange of the brake drum and oscillate about an axis parallel thereto.

My present invention, therefore, comprehends a brake assembly having a vehicular wheel and brake drum associated therewith, which are provided with hoods or scoops for directing a stream of air over the brake mechanisms.

Other objects and advantages more or less ancillary to the foregoing and the manner in which all the various objects are realized will appear in the following description, which considered in connection with the accompanying drawing, sets forth the preferred embodiment of the invention.

Referring to the drawing wherein the preferred embodiment of the invention is illustrated:

Figure 1 is an elevational view of a vehicular wheel showing the hoods or scoops affixed thereon;

Figure 2 is a transverse sectional view of a fragmentary portion of the vehicular wheel and brake drum, showing the arrangement of the hoods or scoops which are provided to effect the circulation of air over and about the brake shoes and drum, the section being taken on a plane indicated by line 2—2 of Figure 1;

Figure 3 is a transverse sectional view of a fragmentary portion of a vehicular wheel and brake drum assembly, showing the hoods or scoops affixed on the wheel and brake drum, the section being taken on a plane indicated by line 3—3 of Figure 1.

Referring to Fig. 3, the brake assembly embodies a vehicular drive shaft 10 having a hub 11 keyed thereon for the support of a brake drum 12 and a wheel 13 of conventional form.

The brake drum 12 has disposed contiguous its inner and outer surfaces thereof the brake shoes 14 and 15, which are pivotally supported on pintles 16 and 17 secured in an arm 18. The pintle 17 has an eccentric head portion 19 formed on an end thereof which is clamped in a split boss 20 in the lower end of the arm 18. The eccentric head portion 19 is provided with a nut 22 which is adapted to be engaged by a wrench, or other suitable means to facilitate the adjustment of the brake shoes with respect to the drum 12 in order to compensate for the wear of the brake lining. Formed on the internal brake shoe 14 there is an abutment 23 having pivotally mounted thereon an arm 24 which is connected with a brake actuating mechanism, not shown, to effect the oscillation of the arms 18 and the consequent engagement of the brake shoes with the brake drum 12.

Formed in the wheel 13 equidistant the hub 11 and each other there are a plurality of openings 26 having hoods or scoops 27 associated therewith in such a manner as to direct streams of air over the external brake shoe 15. The brake drum 12 is provided with a plurality of openings 28 aligned with the openings formed in the wheel 13. Hoods or scoops 29 are mounted on the brake drum to direct streams of air through the openings 28 and over the internal brake shoe 14.

In the operation of the brake, it has been found that the heat generated by the frictional engagement of the lining with the drum frequently impairs the efficiency of the brake assembly and even devulcanizes the tires. In the improved structure the rotation of the wheel 13 and brake drum 12 will cause a stream of air to be directed through the openings 26 and 28 and over the brake shoes and drum, thus dissipating the heat produced therein. In providing vents or scoops on both the wheel and brake drum, separate streams or currents of air are circulated over and about each of the brake shoes. Furthermore, since the vents in the wheel and drum are disposed in aligned relation, the columns of air introduced through the wheel are circulated between the wheel and drum before they are interrupted by the scoops on the drum, thus assuring a more complete and positive ventilation of the chambers defined by the wheel rim and brake drum flange.

As shown in Fig. 1, the mouth or open ends of the hoods are disposed relative to the direction of rotation of the wheel so that the air scooped thereby will be forced with appreciable velocity within the confines of the wheel and drum. Each of the scoops mounted on the wheel 13 will direct a stream of air through its complementary opening where it will impinge the aligned hoods mounted on the brake drum. The streams of air circulating over the external brake shoe are interrupted by the next succeeding scoop on the brake drum which deflects the air through the openings in the drum and effects the cooling of the internal brake mechanism.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A vehicular wheel assembly embodying a wheel having a plurality of openings formed therein, a brake drum having openings therein disposed in aligned relation with the openings in said wheel, a pair of brake engaging shoes disposed contiguous the inner and outer surfaces of the brake drum and means secured on said wheel and on said drum for directing a stream of air through the respective openings therein and over the brake shoes.

2. In a vehicular wheel and brake assembly, a brake cooling structure, embodying, a wheel having a plurality of openings therein, a drum having openings in radial and circumferential alignment with the openings in said wheel, an internal and external brake shoe engageable with said drum, scoops secured to said wheel adjacent the openings therein for directing a stream of air over the external brake shoe and scoops mounted on said drum for directing a stream of air over the internal brake shoe.

3. A vehicular wheel assembly embodying a wheel having a plurality of apertures formed therein, a brake drum having apertures therein disposed in aligned relation with the apertures in said wheel, a pair of brake engaging shoes disposed contiguous the inner and outer surface of the brake drum, hoods formed with an open end secured to said wheel and drum adjacent said apertures, the open end of the hoods on the wheel facing the direction of rotation of said wheel, whereby the external brake shoe is cooled by the air passing through the hoods on the wheel and the internal brake shoe is cooled by the air passing through the hoods on the drum.

4. A vehicular wheel assembly embodying a wheel having a plurality of apertures formed therein, a brake drum having apertures therein disposed in aligned relation with the apertures in said wheel, a pair of brake engaging shoes disposed contiguous the inner and outer surface of the brake drum, hoods formed with an open end secured to said wheel and drum adjacent said apertures, the open end of the hoods on the wheel facing the direction of rotation of said wheel, the hoods on the wheel being disposed to direct streams of air against the hoods on said brake drum and the external brake shoe to effect the dissipation of heat therefrom, the hoods on the brake drum being disposed to direct streams of air against the internal brake shoe to effect the dissipation of heat therefrom.

RALPH H. ROSENBERG.